US009009523B2

(12) United States Patent
Jiang et al.

(10) Patent No.: US 9,009,523 B2
(45) Date of Patent: Apr. 14, 2015

(54) METHOD AND APPARATUS FOR ISOLATING A FAULT IN A CONTROLLER AREA NETWORK

(71) Applicant: GM Global Technology Operations LLC, Detroit, MI (US)

(72) Inventors: Shengbing Jiang, Rochester Hills, MI (US); Yilu Zhang, Northville, MI (US); Mutasim A. Salman, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 226 days.

(21) Appl. No.: 13/686,361

(22) Filed: Nov. 27, 2012

(65) Prior Publication Data

US 2014/0149801 A1    May 29, 2014

(51) Int. Cl.
| | |
|---|---|
| G06F 11/00 | (2006.01) |
| G06F 11/20 | (2006.01) |
| G06F 11/07 | (2006.01) |
| H04L 12/24 | (2006.01) |

(52) U.S. Cl.
CPC .......... G06F 11/2005 (2013.01); G06F 11/079 (2013.01); H04L 12/24 (2013.01)

(58) Field of Classification Search
CPC ....... G06F 7/00; G06F 17/00; G06F 11/2005; G06F 11/2017; G06F 11/30

USPC .......................................................... 714/4.5
See application file for complete search history.

(56) References Cited

U.S. PATENT DOCUMENTS

| | | | |
|---|---|---|---|
| 7,812,617 B2 | 10/2010 | Hofman | |
| 8,213,321 B2 | 7/2012 | Butts et al. | |
| 2004/0193737 A1* | 9/2004 | Huffman et al. | 710/1 |
| 2008/0186870 A1* | 8/2008 | Butts et al. | 370/252 |
| 2011/0188371 A1 | 8/2011 | Brunnberg et al. | |
| 2012/0158240 A1 | 6/2012 | Downs, Jr. et al. | |
| 2013/0234523 A1* | 9/2013 | Anichkov et al. | 307/82 |

OTHER PUBLICATIONS

U.S. Appl. No. 13/659,159, Jiang.
U.S. Appl. No. 13/659,295, Jiang.

* cited by examiner

*Primary Examiner* — Jigar Patel (57) ABSTRACT

A controller area network (CAN) has a plurality of CAN elements including a communication bus and controllers. A method for monitoring the CAN includes identifying each of the controllers as one of an active controller and an inactive controller. A fault-active controller isolation process is executed to detect and isolate presence of a fault-active controller. A fault isolation process can be executed to detect and isolate presence of one of a wire open fault, a wire short fault and a controller fault when one of the controllers is identified as an inactive controller. Presence of a fault associated with a persistent bus disturbance in the CAN is detected when a bus error count is greater than a predetermined threshold continuously for a predetermined period of time.

17 Claims, 5 Drawing Sheets

METHOD AND APPARATUS FOR ISOLATING A FAULT IN A CONTROLLER AREA NETWORK

TECHNICAL FIELD

This disclosure is related to communications in controller area networks.

BACKGROUND

The statements in this section merely provide background information related to the present disclosure. Accordingly, such statements are not intended to constitute an admission of prior art.

Vehicle systems include a plurality of subsystems, including by way of example, engine, transmission, ride/handling, braking, HVAC, and occupant protection. Multiple controllers may be employed to monitor and control operation of the subsystems. The controllers can be configured to communicate via a controller area network (CAN) to coordinate operation of the vehicle in response to operator commands, vehicle operating states, and external conditions. A fault can occur in one of the controllers that affects communications via a CAN bus.

Known CAN systems employ a bus topology for the communication connection among all the controllers that can include a linear topology, a star topology, or a combination of star and linear topologies. Known high-speed CAN systems employ linear topology, whereas known low-speed CAN systems employ a combination of the star and linear topologies. Known CAN systems employ separate power and ground topologies for the power and ground lines to all the controllers. Known controllers communicate with each other through messages that are sent at different periods on the CAN bus. Topology of a network such as a CAN network refers to an arrangement of elements. A physical topology describes arrangement or layout of physical elements including links and nodes. A logical topology describes flow of data messages or power within a network between nodes employing links.

Known systems detect faults at a message-receiving controller, with fault detection accomplished for the message using signal supervision and signal time-out monitoring at an interaction layer of the controller. Faults can be reported as a loss of communications. Such detection systems generally are unable to identify a root cause of a fault, and are unable to distinguish transient and intermittent faults. One known system requires separate monitoring hardware and dimensional details of physical topology of a network to effectively monitor and detect communications faults in the network.

SUMMARY

A controller area network (CAN) has a plurality of CAN elements including a communication bus and controllers. A method for monitoring the CAN includes identifying each of the controllers as one of an active controller and an inactive controller. A fault-active controller isolation process is executed to detect and isolate presence of a fault-active controller. A fault isolation process can be executed to detect and isolate presence of one of a wire open fault, a wire short fault and a controller fault when one of the controllers is identified as an inactive controller. Presence of a fault associated with a persistent bus disturbance in the CAN is detected when a bus error count is greater than a predetermined threshold continuously for a predetermined period of time.

BRIEF DESCRIPTION OF THE DRAWINGS

One or more embodiments will now be described, by way of example, with reference to the accompanying drawings, in which.

DETAILED DESCRIPTION

Figure 1:
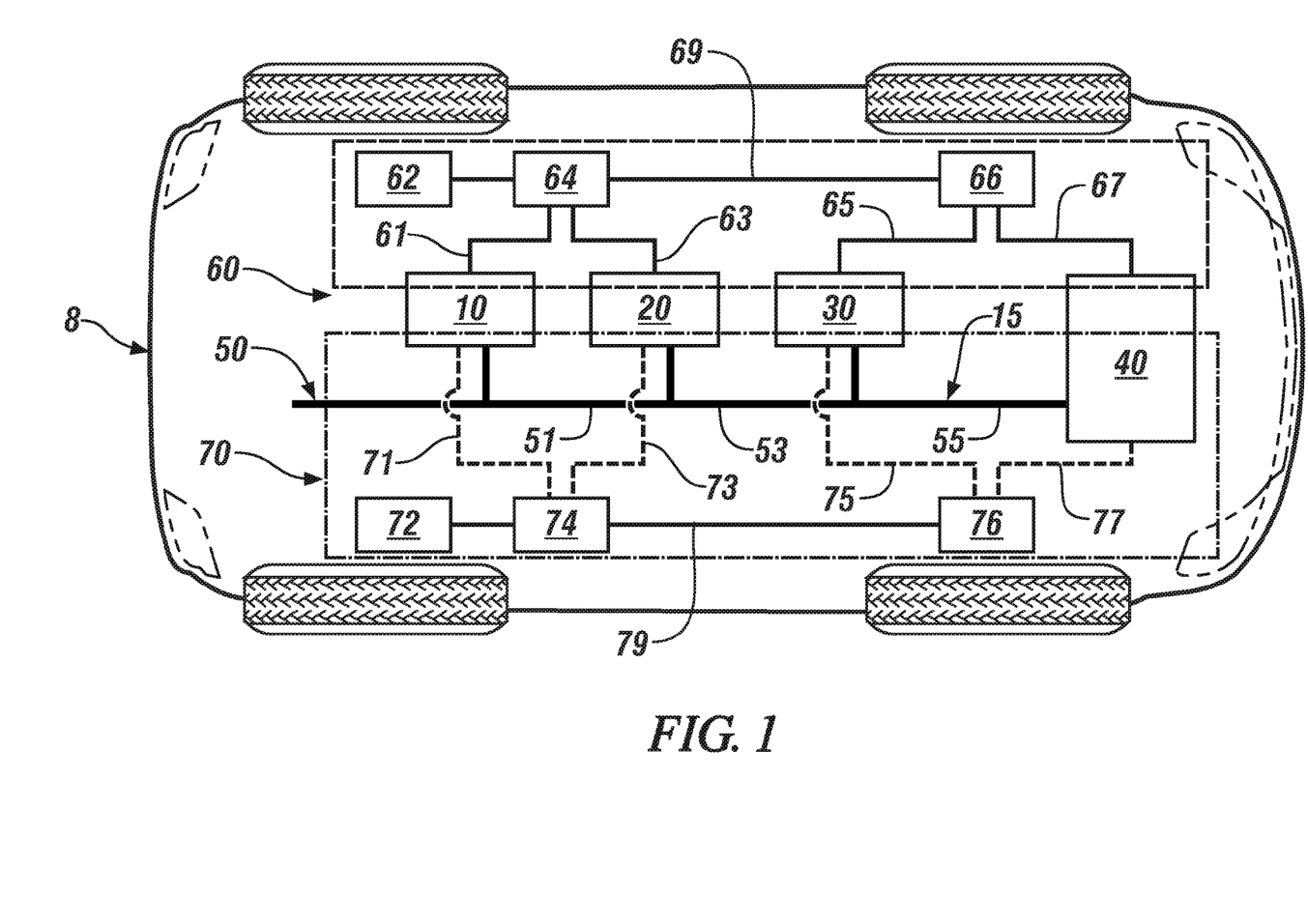
FIG. 1 illustrates a vehicle including a controller area network (CAN) including a CAN bus and a plurality of nodes, e.g., controllers, in accordance with the disclosure.

Referring now to the drawings, wherein the showings are for the purpose of illustrating certain exemplary embodiments only and not for the purpose of limiting the same, FIG. 1 schematically illustrates a vehicle 8 including a controller area network (CAN) 50 including a CAN bus 15 and a plurality of nodes, i.e., controllers 10, 20, 30 and 40. The term "node" refers to any active electronic device that signally connects to the CAN bus 15 and is capable of sending, receiving, or forwarding information over the CAN bus 15. Each of the controllers 10, 20, 30 and 40 signally connects to the CAN bus 15 and electrically connects to a power grid 60 and a ground grid 70. Each of the controllers 10, 20, 30 and 40 includes an electronic controller or other on-vehicle device that is configured to monitor or control operation of a subsystem of the vehicle 8 and communicate via the CAN bus 15. In one embodiment, one of the controllers, e.g., controller 40, is configured to monitor the CAN 50 and the CAN bus 15, and may be referred to herein as a CAN controller. The illustrated embodiment of the CAN 50 is a non-limiting example of a CAN, which may be employed in any of a plurality of system configurations.

The CAN bus 15 includes a plurality of communications links, including a first communications link 51 between controllers 10 and 20, a second link communications 53 between controllers 20 and 30, and a third communications link 55 between controllers 30 and 40. The power grid 60 includes a power supply 62, e.g., a battery that electrically connects to a first power bus 64 and a second power bus 66 to provide electric power to the controllers 10, 20, 30 and 40 via power links. As shown, the power supply 62 connects to the first power bus 64 and the second power bus 66 via power links that are arranged in a series configuration, with power link 69 connecting the first and second power buses 64 and 66. The first power bus 64 connects to the controllers 10 and 20 via power links that are arranged in a star configuration, with power link 61 connecting the first power bus 64 and the controller 10 and power link 63 connecting the first power bus 64 to the controller 20. The second power bus 66 connects to the controllers 30 and 40 via power links that are arranged in a star configuration, with power link 65 connecting the second power bus 66 and the controller 30 and power link 67 connecting the second power bus 66 to the controller 40. The ground grid 70 includes a vehicle ground 72 that connects to a first ground bus 74 and a second ground bus 76 to provide electric ground to the controllers 10, 20, 30 and 40 via ground links. As shown, the vehicle ground 72 connects to the first ground bus 74 and the second ground bus 76 via ground links that are arranged in a series configuration, with ground link 79 connecting the first and second ground buses 74 and 76. The first ground bus 74 connects to the controllers 10 and 20 via ground links that are arranged in a star configuration, with ground link 71 connecting the first ground bus 74 and the controller 10 and ground link 73 connecting the first ground bus 74 to the controller 20. The second ground bus 76 connects to the controllers 30 and 40 via ground links that are arranged in a star configuration, with ground link 75 connecting the second ground bus 76 and the controller 30 and ground link 77 connecting the second ground bus 76 to the controller 40. Other topologies for distribution of communications, power, and ground for the controllers 10, 20, 30 and 40 and the CAN bus 15 can be employed with similar effect.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Each of the controllers 10, 20, 30 and 40 transmits and receives messages across the CAN 50 via the CAN bus 15, with message transmission rates occurring at different periods for different ones of the controllers. A CAN message has a known, predetermined format that includes, in one embodiment, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CDC), 2-bit acknowledgement (ACK), a 7-bit end-of-frame (EOF) and a 3-bit interframe space (IFS). A CAN message can be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count. Known CAN bus protocols include providing network-wide data consistency, which can lead to globalization of local errors. This permits a faulty, non-silent controller to corrupt a message on the CAN bus 15 that originated at another of the controllers. A faulty, non-silent controller is referred to herein as a fault-active controller.

Figure 2:
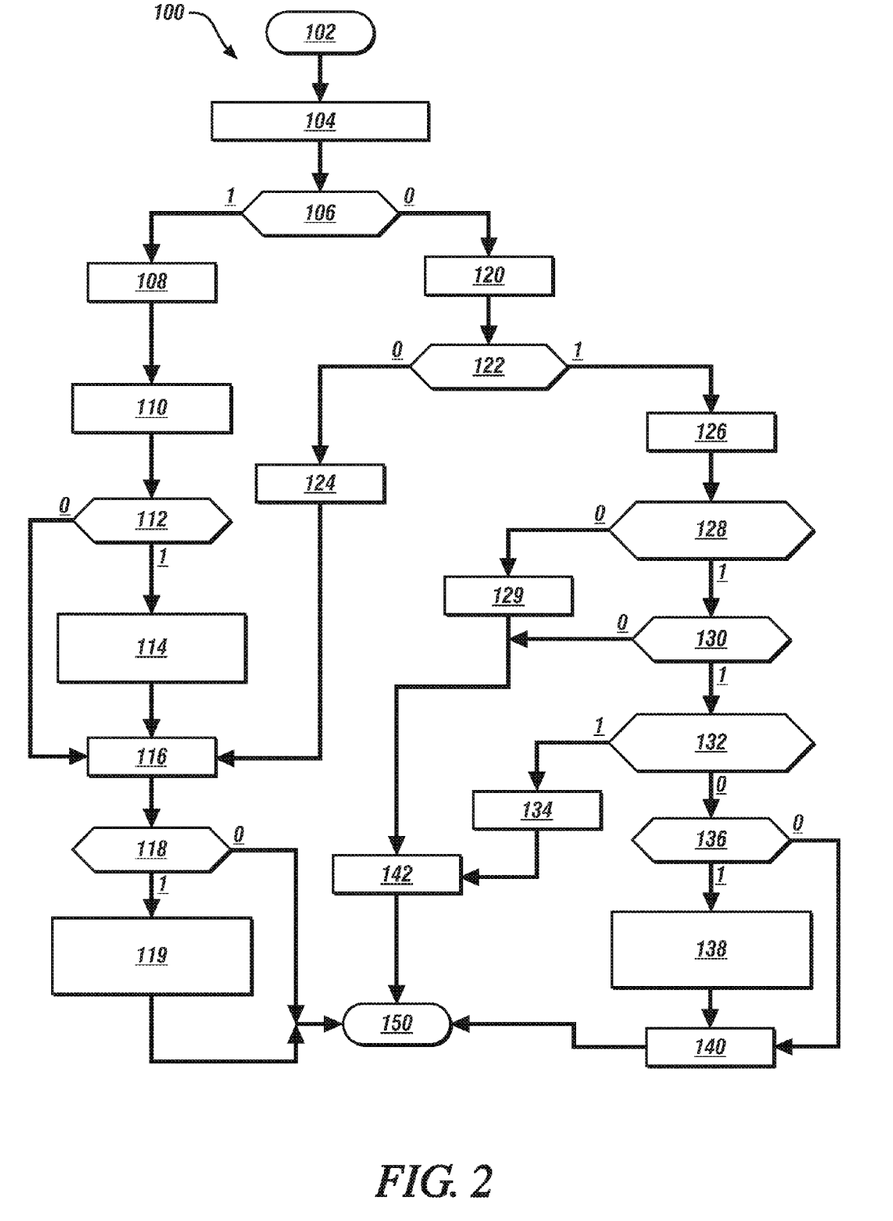
FIG. 2 illustrates an integrated controller area network monitoring control scheme that is periodically executed to monitor and detect presence of communications faults in a CAN, in accordance with the disclosure.

FIG. 2 illustrates an integrated controller area network monitoring control scheme (control scheme) 100 that is periodically executed to monitor and detect presence of communications faults in a CAN. A communications fault leads to a corrupted message on the CAN bus 15, and can be the result of a fault in one of the controllers 10, 20, 30 and 40, a fault in one of the communications links of the CAN bus 15, a fault in one of the power links of the power grid 60, and/or a fault in one of the ground links of the ground grid 70. The control scheme 100 integrates processes for topology-based and bus error count-based fault detection and isolation and processes to detect and isolate open and short wire faults in communications lines, power lines and ground lines and controller silent/active faults. The control scheme 100 can also detect presence of multiple faults. The control scheme 100 monitors and identifies conditions under which one of the fault-detection algorithms can be applied for efficaciously detecting and isolating a fault, and avoids incorrect fault detection and isolation while the system is recovering from an intermittently occurring fault. The control scheme 100 also detects presence of a persistent bus disturbance fault that is either a wire impedance fault or a faulty controller. Before the first time execution of the control scheme 100 upon power-on there is an initialization operation as follows: Delay_Stop_A2=0; A2_Trigger=0; Delay_Trigger_A3=0; A3_Trigger=0; Num_err_high=0. This initialization only executes at power-on and is not executed again during periodic executions of the control scheme 100.

Table 1 is provided as a key to FIG. 2, wherein the numerically labeled blocks and the corresponding functions are set forth as follows.

TABLE 1

| BLOCK | BLOCK CONTENTS |
|---|---|
| 102 | Start |
| 104 | Execute inactive controller detection process to identify active and inactive controllers and determine bus error counts |
| 106 | Is Error[1] Error[2] ≥ Th$_{error-high}$? |
| 108 | Increment Num_err_high |
| 110 | Set<br>Delay_Stop_A2 = A2_Delay<br>Delay_trigger_A3 = 0<br>A3_trigger = 0 |
| 112 | A2_trigger = 0? |
| 114 | Initialization for fault-active controller isolation process:<br>A2_trigger = 1<br>F_Flag = 0<br>F_pending = 0<br>CF = empty |
| 116 | Execute fault-active controller isolation process to detect and isolate fault-active controllers |
| 118 | Num_err_high > 3*Thr? |
| 119 | Num_err_high = 3*Thr<br>Output: Fault associated with persistent bus disturbances caused by bus fault or faulty controller without bus-off fault |
| 120 | Set Num_err_high = 0 |
| 122 | Is Delay_Stop_A2 = 0? |
| 124 | Delay_Stop_A2 = Delay_Stop_A2 − 1 |
| 126 | Set A2_trigger = 0 |
| 128 | Is Delay_Trigger_A3 = 0? |
| 129 | Decrement Delay_Trigger_A3 |
| 130 | Any inactive controllers? |
| 132 | Any controllers recover from inactive to active? |
| 134 | Delay_Trigger_A3 = A3_Delay |
| 136 | A3_Trigger = 0? |

TABLE 1-continued

| BLOCK | BLOCK CONTENTS |
|---|---|
| 138 | Initialization for fault isolation process<br>A3_trigger = 1<br>Fault_Num = 1<br>Ft = empty<br>Set Active_i = 0 for all controllers<br>Set V_active and V_Inactive to empty |
| 140 | Execute fault isolation process to detect and isolate wire open/short faults and controller faults |
| 142 | Set A3_trigger = 0 |
| 150 | End |

The integrated controller area network monitoring control scheme 100 periodically executes as follows to monitor elements of a CAN, e.g., the controller area network (CAN) 50 including CAN bus 15 and controllers 10, 20, 30 and 40 described with reference to FIG. 1. The execution period is preferably $T_d$=min{BusOff_Reset_Delay/4, $Th_i$, i=1, 2, ... n}, wherein BusOff_Reset_Delay is a calibratable value (160 ms by default) and $Th_i$ is the time-out value for the active supervision of controller $C_i$, i=1, n, and is calibratable (by default time of $Th_i$=2.5*minimal message period of controller $C_i$). After initializing the terms, an inactive controller detection process 200 executes to determine active and inactive reports for each of the controllers in the CAN. A bus error count for the last N cycles (N=max {floor($Th_i/T_d$)+1, i=1, ..., n}) is also determined, where floor(x) is the function that returns the largest integer not greater than x. The combined bus error count for the current and previous cycles is checked to determine whether it is greater than an upper threshold, which is a calibratable value (32 by default). When the combined bus error count exceeds the upper threshold, a timer is set (Delay_Stop_A2 to A2_DELAY (calibratable, 10*ceiling(Bus_Off_Reset_Delay/$T_d$) by default, where ceiling(x) is the function that returns the smallest integer not less than x. A fault-active controller isolation process executes to detect and isolate any fault-active controller. The fault-active controller isolation process executes until the timer times out. When the timer times out, it determines whether there are any inactive controllers and also determines whether Delay_Trigger_A3 is zero. If such conditions are met, a fault isolation process executes to detect and isolate wire open/short faults and controller silent faults. If a controller recovers from inactive to active, the Delay_Trigger_A3 is set to prevent execution of the fault isolation process during the recovery. Any persistent bus disturbance faults, e.g., a wire impedance fault or a faulty controller without a corresponding bus-off fault can be detected, and are indicated when the bus error count remains high continuously for a period of time. Details of the operation of the control scheme 100 are explained in detail with reference to FIGS. 2, 3, 4, 5 and 6.

Before the first execution of the control scheme 100 upon the power-on of the controller node, operation is initialized, which includes initializing the following parameters to the following states:
Delay_Stop_A2=0;
A2_Trigger=0;
Delay_Trigger_A3=0;
A3_Trigger=0;
Bus error count (Num_err_high)=0; and
A2_DELAY and A3_DELAY=10*Thr, or other suitable states, wherein Thr=Bus_Off_Reset_Delay/$T_d$, by default and
Bus_Off_Reset_Delay=160 ms by default, or another suitable calibratable value.

Upon initiation (102), the inactive controller detection process 200 executes to identify active and inactive controllers and determine bus error counts (Num_err_count) (104). This operation is described with reference to FIG. 3.

A method for detecting a fault-active controller includes counting a quantity of bus error frames (Bus_Error_Frame_Count) on the CAN bus and monitoring controller status for each of the controllers connected to the CAN bus to isolate a fault-active controller. A controller whose status transitions from active to inactive, i.e., to a bus-off error status, and has a corresponding bus error count that transitions from high to low is a candidate for being a fault-active controller.

Figure 3:
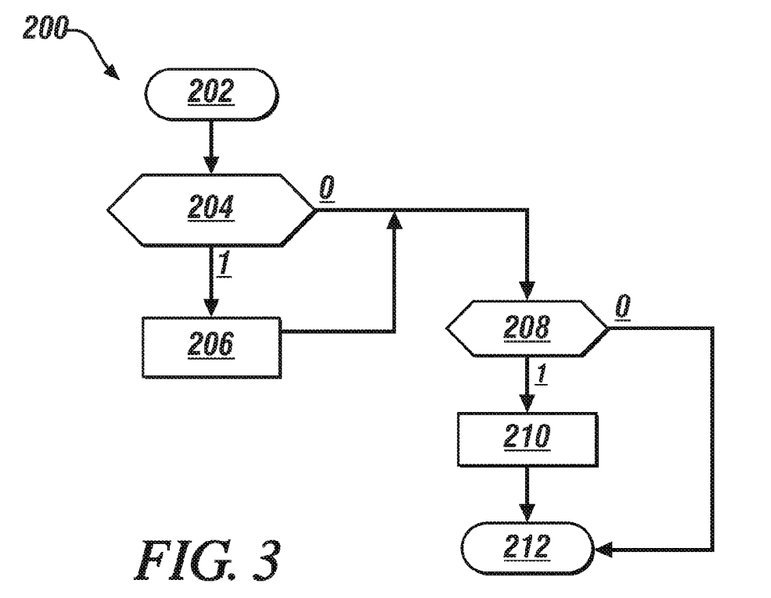
FIG. 3 illustrates an inactive controller detection process that executes to monitor controller status, including detecting whether one of the controllers connected to the CAN bus is inactive, in accordance with the disclosure.

FIG. 3 schematically illustrates an inactive controller detection process 200 that executes to monitor controller status including detecting whether one of the controllers connected to the CAN bus is inactive. The inactive controller detection process 200 is preferably executed by a bus monitoring controller, e.g., controller 40 of FIG. 1. The inactive controller detection process 200 can be called periodically or caused to execute in response to an interruption. An interruption occurs when a CAN message is received by the bus monitoring controller, or alternatively, when a supervision timer expires. Note that before the first execution of the process 200 upon the power-on of the controller node, the following initialization is executed once and it will not be executed again in the periodical executions of the process: $T_i$=$Th_i/T_d$, Error[i]=0 for i=1, N, N=max{floor($Th_i/T_d$)+1, i=1, ..., n}. Table 2 is provided as a key to FIG. 3, wherein the numerically labeled blocks and the corresponding functions are set forth as follows.

TABLE 2

| BLOCK | BLOCK CONTENTS |
|---|---|
| 202 | Set<br>Error[i + 1] = Error[i], i = N − 1, ..., 1;<br>Error[1] = Bus_Error_Frame_Count_in_Current_Cycle;<br>$T_i$ = $T_i$ − 1 if $T_i$ > 0, i = 1, ..., n; |
| 204 | Receive message $m_i$ from controller $C_i$? |
| 206 | Active$_i$ = 1<br>Inactive$_i$ = 0<br>Reset $T_i$ = $Th_i$ |
| 208 | Is $T_i$ = 0 for any controller $C_i$? |
| 210 | For all such controllers $C_i$:<br>Active$_i$ = 0<br>Inactive$_i$ = 1 |
| 212 | Return to control scheme 100 |

The inactive controller detection process 200 monitors CAN messages on the CAN bus. Each of the controllers is designated $C_i$, with i indicating a specific one of the controllers from 1 through j. Each controller $C_i$ transmits a CAN message $m_i$, and the period of the CAN message $m_i$ from controller $C_i$ may differ from the CAN message period of other controllers. Each of the controllers $C_i$ has an inactive flag (Inactive$_i$) indicating the controller is inactive, and an active flag (Active$_i$) indicating the controller is active. Initially, the inactive flag (Inactive$_i$) is set to 0 and the active flag (Active$_i$) is also set to 0. Thus, the active/inactive status of each of the controllers $C_i$ is indeterminate. A timer $T_i$ is employed for the active supervision of each of the controllers $C_i$. The time-out value for the supervision timer is $Th_i$, which is calibratable. In one embodiment, the time-out value for the supervision timer is $Th_i$ is set to 2.5 times a message period (or repetition rate) for the timer $T_i$ of controller $C_i$.

A record is made of the quantity of bus error frames, i.e., bus error count for N execution cycles with the quantity of execution cycles determined as a maximum of floor($Th_i/T_d$)+

1 for all the controllers $C_i$, i=1, ..., n, wherein n represents the quantity of controllers and N represents the maximum number of cycles from the time when the bus error count would cause one of the controllers to achieve bus-off error status to the time when the affected controller is detected as inactive. N is calculated as follows: N=max{floor($Th_i/T_d$)+1, i=1, ..., n}, i.e., error register Error[i], wherein i=1, ..., N. The error registers Error[i] are employed to keep track of the bus error counts. Initially, the error registers are empty, i.e., Error[i]=0 for all i.

During each execution of the controller isolation process 200, the bus error counts for the last N cycles are kept and stored in the error registers Error[i], i=1, ..., N and the bus error count on the CAN bus from the CAN controller (Error [1]) is obtained for the previous $T_d$ time interval (202). The bus error counts for the last N cycles are continually rolled over in the error registers Error[i], i=1, ..., N, as i progressively indexes from i=1 through i=N, and then iteratively starts at i=1 again.

The CAN messages on the CAN bus are employed to determine whether a CAN message has been received from any of the controllers $C_i$ (204). If not (204)(0), the operation proceeds directly to block 208. When a CAN message has been received from any of the controllers $C_i$ (204)(1), the inactive flag for the controller $C_i$ is set to 0 (Inactive$_i$=0), the active flag for the controller $C_i$ is set to 1 (Active$_i$=1), and the timer $T_i$ is reset to the time-out value $Th_i$ for the supervision timer for the controller $C_i$ that has sent CAN messages (206). The logic associated with this action is that only active controllers send CAN messages.

The system determines whether the timer $T_i$ has reached zero for the respective controller $C_i$ (208). If not (208)(0), this iteration of the inactive controller detection process 200 ends (212). If so (208)(1), the inactive flag is set to 1 (Inactive$_i$=1) and the active flag is set to 0 (Active$_i$=0) for the respective controller $C_i$ (210). When CAN messages have been received from all the controllers $C_i$ within the respective time-out values $Th_i$ for all the supervision timers, inactive controller detection process 200 indicates that all the controllers $C_i$ are presently active. When the supervision timer expires, the inactive controller detection process 200 identifies as inactive those controllers $C_i$ wherein the inactive flag is set to 1 (Inactive$_i$=1) and the active flag is set to 0 (Active$_i$=0), and this iteration of the inactive controller detection process 200 ends (212). The operation returns to the control scheme 100 with active and inactive controllers identified and bus error counts determined.

After the inactive controller detection process 200 executes (104) to identify each of the controllers as either an active controller or an inactive controller and determine bus error counts, the control scheme 100 evaluates states to determine whether there is a need to execute a fault-active controller isolation process 300 to detect presence of any fault-active controllers in the CAN. This includes evaluating a quantity of bus error frames for the current cycle and a previous cycle to determine whether the combined bus error count exceeds an upper threshold, which is a calibratable value that is set at 32 by default (Is Error[1]+Error[2]≥$Th_{error\_high}$?) (106). When the combined bus error count exceeds the upper threshold (106)(1), a series of terms are assigned or adjusted, including incrementing the bus error count (Num_err_high) (108) and setting other terms (110) including setting a timer Delay_Stop_A2=A2_Delay, which is calibratable and is set by default as follows: 10*ceiling(Bus_Off_Reset_Delay/$T_d$). Other terms are set as follows, including:

Delay_trigger_A3=0; and
A3_trigger=0.

The control scheme 100 determines whether the fault-active controller isolation process 300 is presently running, which is indicated when the term A2_Trigger is non-zero (112). When the fault-active controller isolation process 300 is presently running (112)(0), the fault-active controller isolation process 300 continues to execute to detect and isolate fault-active controllers, if any (116). When the fault-active controller isolation process 300 is not presently running (112)(1), several parameters are initialized as follows (114):
A2_trigger=1;
F_Flag=0;
F_pending=0; and
CF=empty.

The terms include A2_trigger, which triggers operation of the fault-active controller isolation process 300. Other terms include a fault pending flag (F_Pending) and a fault active flag (F_Flag), which are initially set to "0." The CF term represents the set of candidate fault-active controllers, which is initially empty. After initializing the aforementioned parameters, the fault-active controller isolation process 300 executes to detect and isolate fault-active controllers, if any (116).

When the combined bus error count is less than the upper threshold (106)(0), the bus error count (Num_err_high) is set equal to zero (120), and the timer Delay_Stop_A2 is evaluated to determine whether it has reached zero (122). If not (122)(0), the timer Delay_Stop_A2 is decremented (124), and the fault-active controller isolation process 300 executes to detect and isolate fault-active controllers (116). The fault-active controller isolation process 300 executes until the timer Delay_Stop_A2 times out.

Figure 4:
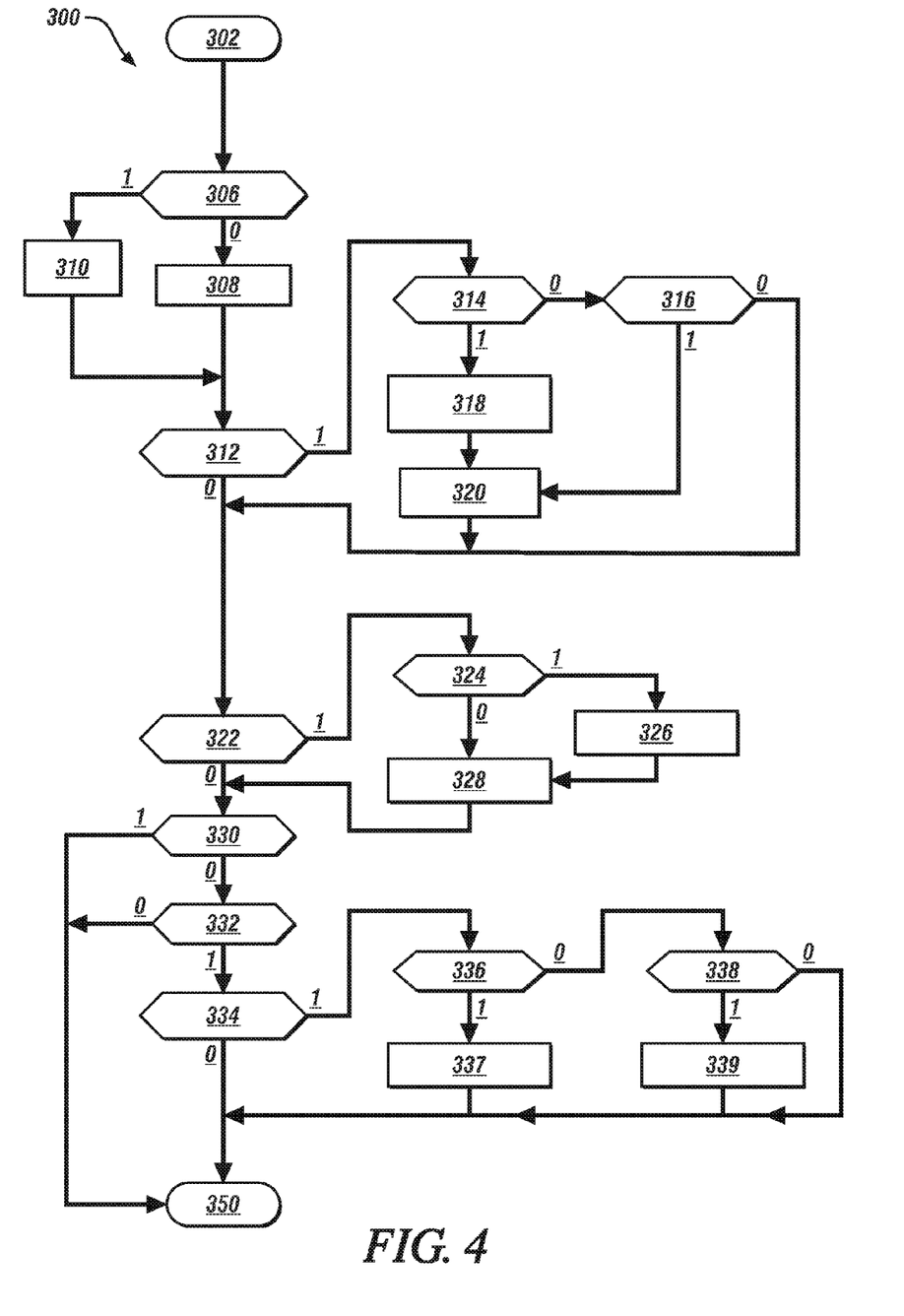
FIG. 4 illustrates a fault-active controller isolation process for isolating a fault-active controller that is connected to the CAN bus, in accordance with the disclosure.

FIG. 4 schematically illustrates a fault-active controller isolation process 300 for detecting and isolating a fault-active controller, if any, that is connected to the CAN bus. The fault-active controller isolation process 300 is preferably executed by a bus monitoring controller, e.g., controller 40 of FIG. 1. Table 3 is provided as a key to FIG. 4, wherein the numerically labeled blocks and the corresponding functions are set forth as follows.

TABLE 3

| BLOCK | BLOCK CONTENTS |
|---|---|
| 302 | Start controller isolation process |
| 306 | Are all controllers active? |
| 308 | CF = CF − {i│Active$_i$ = 1} |
| 310 | F_Flag = 0 |
|  | F_Pending = 0 |
|  | CF = Empty |
| 312 | Error[1] + Error[2] ≥$Th_{error\_high}$? |
| 314 | F_Flag = 1? |
| 316 | Error[1] >0? |
| 318 | Output CF as the set of candidate fault-active controllers; Set F_Flag = 0 |
| 320 | Set CF = $V_C$; Set Active$_i$ = 0 for all controllers $C_i$ |
| 322 | F_Pending = 1? |
| 324 | Error[1] ≤ $Th_{error\_low}$? |
| 326 | F_Flag = 1 |
| 328 | F_Pending = 0 |
| 330 | F_Flag = 1? |
| 332 | Any new inactive controller $C_i$? |
| 334 | Error[k] + Error[k + 1] ≥ $Th_{error\_high}$ for any k starting from 1 to N − 1 ? |
| 336 | Error[j] ≤ $Th_{error\_low}$ for all j = 1, ..., k? |
| 337 | F_Flag = 1 |
| 338 | k = 1? |
| 339 | F_Pending = 1 |
| 350 | End iteration, return to control scheme 100 |

Initially, the error registers are empty, i.e., Error[i]=0 for all i. Thresholds $Th_{error-high}$ and $Th_{error-low}$ are used to indicate high and low bus error count thresholds, respectively. In one embodiment the high bus error count threshold $Th_{error-high}$ is set at 32 and the low bus error count threshold $Th_{error-low}$ is set at 5. A fault pending flag (F_Pending) and a fault active flag (F_Flag) are employed as described herein, and both are initially set to "0." The term $V_c$ represents the set of all controllers $C_i$ that are connected to the bus, and the term CF represents the set of candidate fault-active controllers and initially it is empty.

During each execution of the controller isolation process 300 (302), the system queries whether all the controllers $C_i$ are active (306), which can include reviewing results from the inactive controller detection process 200 of FIG. 3. When all the controllers $C_i$ are active (306)(1), the fault pending flag is reset (F_Pending=0), the fault active flag is reset (F_Flag=0) and the set of candidate fault-active controllers is emptied (CF=empty) (310). When the controllers $C_i$ are not all active (306)(0), i.e., when one or more of the controllers $C_i$ is inactive, the set of candidate fault-active controllers is updated to include the identified one of the controllers $C_i$ (CF=CF-{i|$Active_i$=1}) (308).

The summation of the bus error count for the previous cycle (e.g., Error[2]) and the bus error count for the present cycle (e.g., Error[1]) are compared to the high bus error count threshold $Th_{error-high}$ (312). When the summation of the bus error counts is greater than or equal to the high bus error count threshold $Th_{error-high}$ (312)(1), it is determined whether the fault active flag has been set (F_Flag=1) (314). When the fault active flag has been set (F_Flag=1) (314)(1), the CF term is output as the set of candidate fault-active controllers and the fault active flag is reset (F_Flag=0) (318). When the fault active flag is set (F_Flag=1) and the bus error count is high, it indicates a fault-active controller is causing bus errors again.

When the fault active flag has not been set (F_Flag=0) (314)(0), it is determined whether the bus error count on the CAN bus from the CAN controller obtained for the previous $T_d$ time interval (indicated by the error register, e.g., Error[1]) is greater than zero (316). When the bus error count on the CAN bus from the CAN controller obtained for the previous $T_d$ time interval (e.g., Error[1]) is greater than zero (316)(1), or after the CF term is output as the set of candidate fault-active controllers and the fault active flag is reset (F_Flag=0) (318), the CF term, i.e., the set of candidate fault-active controllers is updated to include the set $V_c$ of all controllers $C_i$, and the active flag is set to 0 ($Active_i$=0) for all the controllers $C_i$ (320).

When the summation of the previous and present bus error counts is less than the high bus error count threshold $Th_{error-high}$ (312)(0), or when the bus error count on the CAN bus from the CAN controller obtained for the previous $T_d$ time interval (e.g., Error[1]) is zero (316)(0), or subsequent to block 320, it is determined whether the fault pending flag is set (F_Pending=1) (322). When the fault pending flag is set (F_Pending=1) (322)(1), it is determined whether the bus error count on the CAN bus from the CAN controller obtained for the previous $T_d$ time interval (Error[1]) is less than the low bus error count threshold $Th_{error-low}$ (324). When the bus error count on the CAN bus from the CAN controller obtained for the previous $T_d$ time interval (Error[1]) is less than the low bus error count threshold $Th_{error-low}$, (324)(1), the fault active flag is set (F_Flag=1) (326) and the fault pending flag is reset (F_Pending=0) (328). When the bus error count on the CAN bus from the CAN controller obtained for the previous $T_d$ time interval (Error[1]) is not less than the low bus error count threshold $Th_{error-low}$ (324)(0), the fault pending flag is reset (F_Pending=0) without changing the fault active flag (328).

When the fault pending flag is not set (F_Pending=0) (322)(0), or after resetting the fault pending flag (F_Pending=0) (328), the fault active flag is queried to determine whether it has been set (F_Flag=1) (330). If the fault active flag has been set (F_Flag=1) (330)(1), the present iteration of the controller isolation process 300 ends and operation returns to the control scheme 100 (350). When the fault active flag has not been set (F_Flag=0) (330)(0), the system queries whether one of the controllers $C_i$ is newly inactive (332). When one of the controllers $C_i$ is not newly inactive (332)(0), the present iteration of the controller isolation process 300 ends and operation returns to the control scheme 100 (350). When one of the controllers $C_i$ is newly inactive (332)(1), it is queried to determine whether the bus error count on the CAN bus from the CAN controller exceeds the high bus error count threshold $Th_{error-high}$, i.e., Error[k]+Error[k+1]≥high bus error count threshold $Th_{error-high}$, for any value of k from 1 through N−1 (334). When the bus error count on the CAN bus from the CAN controller does not exceed the high bus error count threshold $Th_{error-high}$ (334)(0), the present iteration of the controller isolation process 300 ends and operation returns to the control scheme 100 (350).

When the bus error count on the CAN bus from the CAN controller exceeds the high bus error count threshold $Th_{error-high}$ (334)(1), it is queried to determine whether the bus error count on the CAN bus from the CAN controller is less than the low bus error count threshold $Th_{error-low}$ for error counts from j=1 through k (336). When the bus error count on the CAN bus from the CAN controller is less than the low bus error count threshold $Th_{error-low}$ for error counts from j=1 through k (336)(1), a fault flag is set (F_Flag=1) for the controller $C_i$ (337), and the present iteration of the controller isolation process 300 ends and operation returns to the control scheme 100 (350). When the fault flag is set (F_Flag=1) for the controller $C_i$, it indicates that a fault-active controller has caused bus errors and it is presently among the set of inactive controllers. When the fault flag is set (F_Flag=1), if the bus error count is high again, it indicates the fault-active controller is causing bus errors again. Any controller that never became active in the time interval when the bus error count changed from HIGH-to-LOW-to-HIGH becomes a candidate for the fault-active controller.

When the bus error count on the CAN bus from the CAN controller is not less than the low bus error count threshold $Th_{error-low}$ for error counts from j=1 through k (336)(0), it is determined whether the count k was equal to 1 (338). If the count k was equal to 1 (338)(1), a fault pending flag is set (F_Pending=1) (339), and the present iteration of the controller isolation process 300 ends and operation returns to the control scheme 100 (350). The fault pending flag (F_Pending=1) indicates that the controller was inactive due to being in the bus-off error status, but another iteration is needed to check whether the bus error count will be low the next iteration.

Once a controller becomes inactive, it is checked to determine whether the controller is inactive due to bus errors causing the controller to reach a bus-off error status. If not, a topology-based algorithm is employed to diagnosis other faults. Otherwise, the system checks to determine the bus error count is low after the controller reaches a bus-off error status. If yes then the fault-active controller is among the inactive controllers and the fault flag is set (F_Flag=1). When another iteration is needed to check the low bus error count, the fault pending flag is set (F_Pending=1). The controller isolation process 300 waits for execution of another cycle to verify whether the bus error count will be low after the controller reaches bus-off error status. If the bus error count is low for the next iteration then the fault flag is set (F_Flag=1). Otherwise the fault pending flag is reset (F_Pending=0) after the next iteration. If the count k was not equal to 1 (338)(0), the present iteration of the controller isolation process 300 ends and operation returns to the control scheme 100 (350).

After the present iteration of the fault-active controller isolation process 300 executes to detect and isolate fault-active controllers, the bus error count (Num_err_high) is compared to a threshold (3*Thr) (118). When the bus error count (Num_err_high) is less than the threshold (3*Thr) (118)(0), this iteration of the control scheme 100 ends without further action (150). When the bus error count (Num_err_high) is equal to or greater than the threshold (3*Thr) (118)(1), this is an indication that persistent bus disturbances are present that are caused by either an impedance fault or a faulty controller that has not yet caused a bus-off fault (119). Such information is reported out and this iteration of the control scheme 100 ends (150).

When the timer Delay_Stop_A2 has reached zero (122)(1), the A2_trigger term is set equal to zero (126), and the delay trigger (Delay_Trigger_A3) is evaluated to determine whether it has reached zero (128). When the delay trigger (Delay_Trigger_A3) has not reached zero (128)(0), the delay trigger (Delay_Trigger_A3) is decremented (129), and the A3_trigger is set to zero (142), and this iteration of the control scheme 100 ends without further action (150).

When the delay trigger (Delay_Trigger_A3) has reached zero (128)(1), it is determined whether any of the controllers are presently inactive (130). If any of the controllers are not presently inactive (130)(0), the A3_trigger is set to zero (142), and this iteration of the control scheme 100 ends without further action (150). If any of the controllers are presently inactive (130)(1), it is determined whether any of the controllers have recovered from inactive to active (132). If any of the controllers have recovered from inactive to active (132)(1), the delay trigger (Delay_Trigger_A3) is set equal to A3_Delay (134), and the A3_trigger is set to zero (142), and this iteration of the control scheme 100 ends without further action (150). If any of the controllers have not recovered from inactive to active (132)(0), it is determined whether the algorithm trigger (A3_trigger) is zero (136). When the algorithm trigger (A3_trigger) is zero (136)(1), it indicates a fault isolation process is not presently operating, and several parameters are initialized as follows (138):

A3_Trigger=1;
Fault_Num=1;
Ft=empty;
Set Active_i=0 for all controllers; and
Set V_active and V_Inactive to empty.

When the algorithm trigger (A3_trigger) is not zero (136)(0), it indicates the fault isolation process is presently operating to detect and isolate wire open/short faults and controller faults (140).

Figure 5:
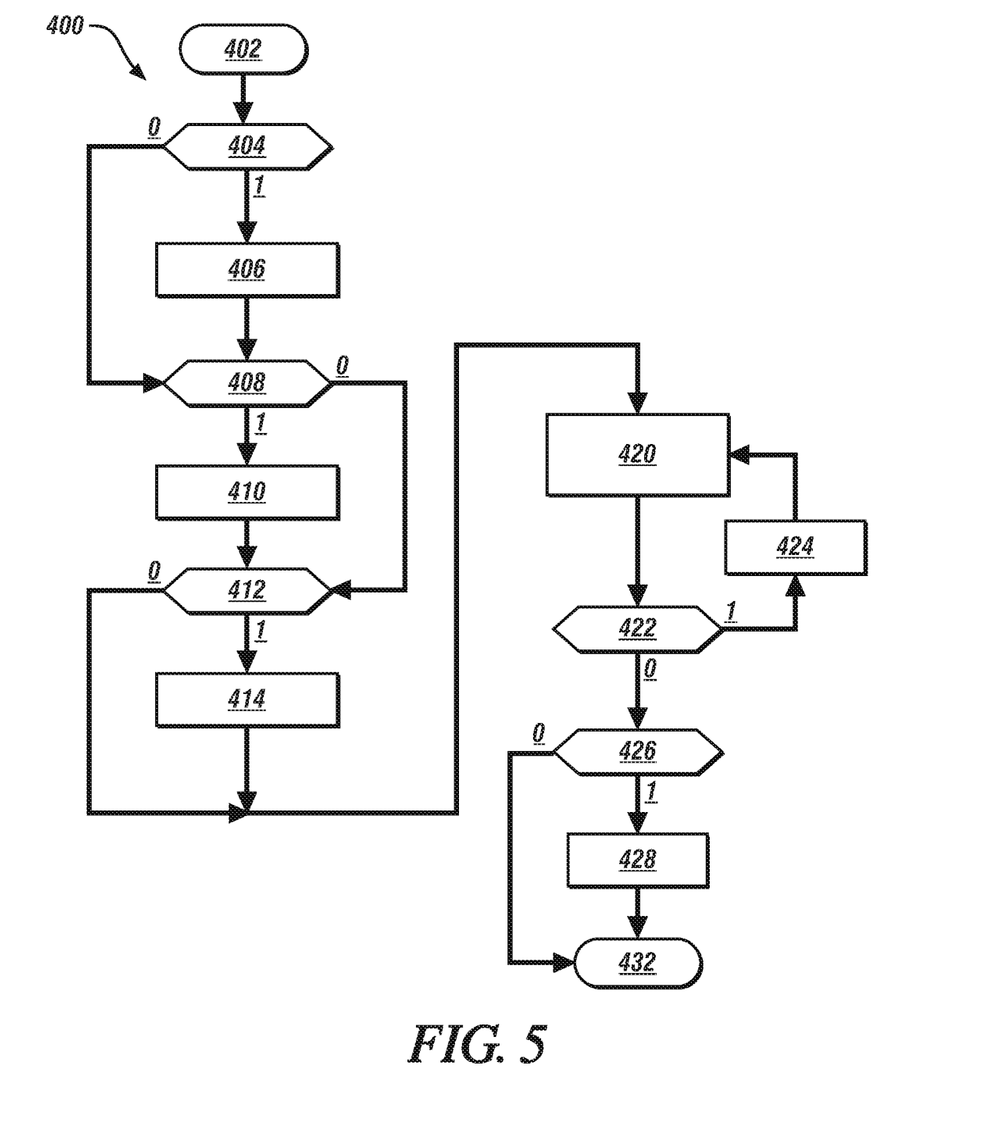
FIG. 5 illustrates a fault isolation process that operates to detect and isolate wire open/short faults and controller faults, in accordance with the disclosure.

FIG. 5 shows one embodiment of a fault isolation process 400 that operates to detect and isolate wire open/short faults and controller faults. The fault isolation process 400 isolates a physical location of a fault in one of the CAN bus 15, the power grid 60 and the ground grid 70. The fault isolation process 400 is preferably implemented in and executed by a bus monitoring controller, e.g., controller 40 of FIG. 1, as one or more algorithms employing calibrations that can be determined during algorithm development and implementation. The fault isolation process 400 is preferably triggered when one of the controllers becomes inactive, e.g., as indicated by the inactive controller detection process 200 described with reference to FIG. 3. Table 4 is provided as a key wherein the numerically labeled blocks and the corresponding functions are set forth as follows.

TABLE 4

| BLOCK | BLOCK CONTENTS |
|---|---|
| 402 | Start fault isolation process |
| 404 | Active$_i$ = 1 for any of the controllers C$_i$, i = 1, . . . n |
| 406 | Add all controllers C$_i$ having active flag set to 1 to V$_{active}$ and remove from V$_{inactive}$ |
| 408 | Inactive$_i$ = 1 for any i ? |
| 410 | Add all controllers C$_i$ having inactive flag set to 1 to V$_{inactive}$ and remove from V$_{active}$ |
| 412 | Any controllers C$_i$ removed from V$_{active}$ and added to V$_{inactive}$? |
| 414 | Fault_Num = Fault_Num + 1<br>Ft = F$_c$<br>Set V$_{active}$ to empty<br>Set Active$_i$ = 0 for all controllers C$_i$ |
| 420 | F$_c$ = {S ⊆ F\|\|S\| = Fault_Num<br>V$_{inactive}$ ⊆ ∪$_{f∈S}$(V$_f^{inactive}$)<br>V$_{active}$ ∩ (∪$_{f∈S}$(V$_f^{inactive}$)) = empty<br>If Ft ≠ empty then ∃R ∈ Ft, R ⊆ S} |
| 422 | Is F = empty and Fault_Num < \|F\|? |
| 424 | Fault_Num = Fault_Num + 1 |
| 426 | Is \|F$_c$\| = 1 or V$_{active}$ ∪ V$_{inactive}$ = V$_{controller}$ |

The fault isolation process 400 includes an active vector V$_{active}$ and an inactive vector V$_{inactive}$ for capturing and storing the identified active and inactive controllers, respectively. The vectors V$_{active}$ and V$_{inactive}$ are initially empty. The Fault_Num term is a counter term that indicates the quantity of multiple faults; initially it is set to zero. In the case of multiple faults, the candidate(s) of a previously identified candidate fault set are placed in the final candidate fault set. The vector Ft is used to store the previously identified candidate fault set and it is empty initially.

The fault isolation process 400 is triggered by occurrence and detection of a communications fault, i.e., one of the faults (f) of the fault set (F). A single fault is a candidate only if its set of inactive controllers includes all the nodes observed as inactive and does not include any controller observed as active. If no single fault candidate exists, it indicates that multiple faults may have occurred in one cycle. Multiple faults are indicated if one of the controllers is initially reported as active and subsequently reported as inactive.

In the case of multiple faults, a candidate fault set (F$_c$) contains multiple single-fault candidates. The condition for a multi-fault candidate fault set includes that its set of inactive nodes (union of the sets of inactive nodes of all the single-fault candidates in the multi-fault candidate fault set) includes all the nodes observed as inactive and does not include any node observed as active, and at least one candidate from the previous fault is still included in the multi-fault candidate fault set. Once the status of all nodes are certain (either active or inactive) or there is only one candidate, the candidate fault set (F$_c$) is reported out. The candidate fault set can be employed to identify and isolate a single fault and multiple faults, including intermittent faults.

The fault isolation process 400 operates as follows. Upon detecting a system or communications fault in the CAN system (402), the system queries whether an active flag has been set to 1 (Active$_i$=1) for any of the controllers C$_i$, i=1, . . . n, indicating that the identified controllers are active and thus functioning (404). If not (404)(0), operation proceeds directly to block 408. If so (404)(1), any identified active controller(s) is added to the active vector V$_{active}$ and removed from the inactive vector V$_{inactive}$ (406).

The system then queries whether an inactive flag has been set to 1 (Inactive$_i$=1) for any of the controllers C$_i$, i=1, ... n, indicating that the identified controllers are inactive (408). If not (408)(0), the operation proceeds directly to block 412. Otherwise (408)(1), those controllers identified as inactive are added to the inactive vector V$_{inactive}$ and removed from the active vector V$_{active}$ (410).

The system determines whether there have been multiple faults by querying whether any of the controllers have been removed from the active vector V$_{active}$ and moved to the inactive vector V$_{inactive}$ (412). If any of the controllers have not been removed from the active vector V$_{active}$ and moved to the inactive vector V$_{inactive}$ (412)(0), the operation proceeds directly to block 420. If any of the controllers have been removed from the active vector V$_{active}$ and moved to the inactive vector V$_{inactive}$ (412)(1), a fault counter is incremented (Fault_Num=Fault_Num+1) (414), the set Ft used to store the candidates of the previous fault is incorporated into the candidate fault set F$_c$ (Ft=F$_c$), the active vector V$_{active}$ is emptied, and the active flags are reset for all the controllers (Active$_i$=0) (414).

Figure 6:
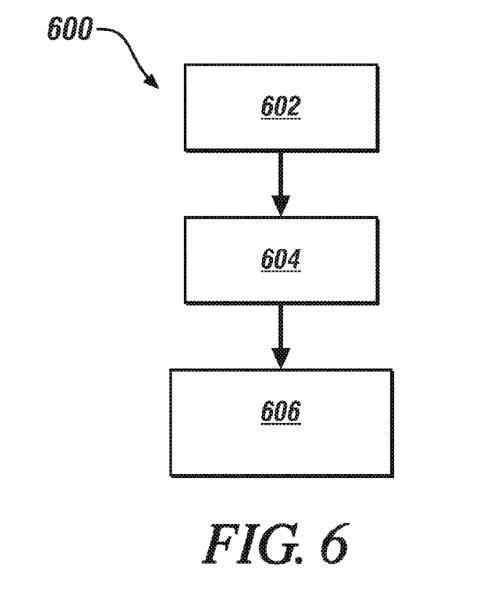
FIG. 6 illustrates a system setup process for characterizing a CAN, in accordance with the disclosure.

Block 420 operates to identify the candidate fault set F$_c$, by comparing the inactive vector V$_{inactive}$ with the fault-specific inactive vector V$_f^{inactive}$, and identifying the candidate faults based thereon. FIG. 6 shows an exemplary system setup process 600 for characterizing a CAN, including developing a fault-specific inactive vector V$_f^{inactive}$. The candidate fault set F$_e$ includes a subset (S) of the fault set (F), wherein the quantity of faults in the subset |S| equals the quantity indicated by the fault counter Fault_Num: (F$_c$={S ⊆F∥S∣=Fault_Num). The inactive set is a subset that can be expressed as follows.

$$V_{inactive} \subseteq \cup_{f \in S}(V_f^{inactive}) \quad [1]$$

and $$V_{active} \cap (\cup_{f \in S}(V_f^{inactive})) = \text{empty} \quad [2]$$

Furthermore, if the previous candidate fault set Ft is not empty, then there exists a term R that is an element of the previous fault set Ft, such that R is a subset of set S (420).

The operation queries whether the candidate fault set F$_c$ is empty, and whether the fault counter Fault_Num is less than the quantity of all possible faults |F| (422). If so (422)(1), the fault counter Fault_Num is incremented (424), and block 420 is re-executed. If not (422)(0), the operation queries whether the candidate fault set F$_c$ includes only a single fault |F$_c$|=1 or whether the combination of the active vector V$_{active}$ and the inactive vector V$_{inactive}$ includes all the controllers (V$_{active}$∪V$_{inactive}$=V$_{controller}$) (426). If not (426)(0), this iteration of the fault isolation process 400 ends and operation returns to the control scheme 100 (432). If so (426)(1), the candidate fault set F$_c$ is output as the set of fault candidates (428), and this iteration of the fault isolation process 400 ends and operation returns to the control scheme 100 (432). The present iteration of the control scheme 100 ends without further action (150).

FIG. 6 schematically shows a system setup process 600 for characterizing a CAN, e.g., the CAN 50 depicted with reference to FIG. 1. The resulting CAN characterization is employed in a CAN fault isolation scheme, e.g., the controller isolation process described with reference to FIG. 3. The CAN can be characterized by modeling the system, identifying faults sets, and identifying and isolating faults associated with different fault sets. Preferably, the CAN is characterized off-line, prior to on-board operation of the CAN during vehicle operation. Table 5 is provided as a key to FIG. 6, wherein the numerically labeled blocks and the corresponding functions are set forth as follows.

TABLE 5

| BLOCK | BLOCK CONTENTS |
|---|---|
| 602 | Generate CAN system model |
| 604 | Identify set of faults f |
| 606 | Identify the set of inactive controllers for each fault f |

The CAN system model is generated (602). The CAN system model includes the set of controllers associated with the CAN, a communication bus topology for communication connections among all the controllers, and power and ground topologies for the power and ground lines to all the controllers. FIG. 1 illustrates one embodiment of the communication bus, power, and ground topologies. The set of controllers associated with the CAN is designated by the vector V$_{controller}$.

A fault set (F) is identified that includes a comprehensive listing of individual faults (f) of the CAN associated with node-silent faults for the set of controllers, communication link faults, power link open faults, ground link open faults, and other noted faults (604).

Sets of inactive and active controllers for each of the individual faults (f) are identified (606). This includes, for each fault (f) in the fault set (F), identifying a fault-specific inactive vector V$_f^{inactive}$ that includes those controllers that are considered inactive, i.e., communications silent, when the fault (f) is present. A second, fault-specific active vector V$_f^{active}$ is identified, and includes those controllers that are considered active, i.e., communications active, when the fault (f) is present. The combination of the fault-specific inactive vector V$_f^{inactive}$ and the fault-specific active vector V$_f^{active}$ is equal to the set of controllers V$_{controller}$. A plurality of fault-specific inactive vectors V$_f^{inactive}$ containing inactive controller(s) associated with different link-open faults can be derived using a reachability analysis of the bus topology and the power and ground topologies for the specific CAN when specific link-open faults (f) are present.

By observing each message on the CAN bus and employing time-out values, an inactive controller can be detected. Based upon a set of inactive controllers, the communication fault can be isolated since different faults, e.g., bus wire faults at different locations, faults at different controller nodes, and power and ground line faults at different locations, will affect different sets of inactive controllers. Known faults associated with the CAN include faults associated with one of the controllers including faults that corrupt transmitted messages and silent faults, open faults in communications. Thus, the bus topology and the power and ground topologies can be used in combination with the detection of inactive controllers to isolate the different faults. When a fault is isolated, the controller can act in accordance with the fault, including developing work-around communications schemes, mitigating occurrence of the fault, and notifying a vehicle operator of the presence of the fault.

CAN systems are employed to effect signal communications between controllers in a system, e.g., a vehicle. The fault isolation process described herein permits location and isolation of a single fault, multiple faults, and intermittent faults in the CAN systems, including faults in a communications bus, a power supply and a ground network.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a controller area network (CAN) including a plurality of CAN elements comprising a communication bus and a plurality of controllers, comprising:
    identifying each of the controllers as one of an active controller and an inactive controller based upon monitored signal communications on the communication bus, comprising:
        generating a CAN system model comprising the CAN elements;
        identifying a plurality of candidate faults associated with each of the CAN elements; and
        identifying each of the controllers as one of an active controller and an inactive controller for each of the candidate faults based upon the CAN system model and the monitored signal communications on the communication bus;
    executing a fault-active controller isolation process to detect and isolate presence of a fault-active controller;
    executing a fault isolation process to detect and isolate presence of one of a wire open fault, a wire short fault and a controller fault when one of the controllers is identified as an inactive controller; and
    detecting presence of a fault associated with a persistent bus disturbance in the CAN when a bus error count is greater than a predetermined threshold continuously for a predetermined period of time.

2. The method of claim 1, wherein identifying the plurality of candidate faults associated with the CAN elements comprises identifying candidate faults associated with the controllers, the communication bus, and a plurality of power links and ground links.

3. The method of claim 2, wherein identifying candidate faults associated with the controllers, the communication bus, and the plurality of power links and ground links comprises identifying node-silent faults for the plurality of controllers, link open faults on the communication bus, power link open faults for the plurality of power links, and ground link open faults for the plurality of ground links.

4. The method of claim 1, wherein identifying a controller as an inactive controller for each of the candidate faults comprises identifying each controller that is communications silent when each of the candidate faults is present based upon the CAN system model.

5. The method of claim 1, wherein executing a fault-active controller isolation process comprises:
    monitoring bus communications including determining bus error counts for a plurality of execution cycles;
    when a bus error count associated with message transmission from one of the controllers exceeds a predetermined threshold, prohibiting said one of the controllers from communicating on the communications bus for a predetermined period of time and including said one of the controllers in a subset of candidate fault-active controllers;
    removing from the subset of candidate fault-active controllers any of the plurality of controllers included within the subset of candidate fault-active controllers that successfully transmits a message; and
    isolating a fault-active controller based upon the subset of candidate fault-active controllers and the bus error counts.

6. The method of claim 5, wherein prohibiting said one of the controllers from communicating on the communication bus comprises prohibiting said one of the controllers from receiving messages and prohibiting said one of the controllers from transmitting messages for the predetermined period of time.

7. The method of claim 5, wherein prohibiting said one of the controllers from communicating on the communication bus comprises prohibiting said one of the controllers from communicating on the communication bus for a predetermined quantity of the execution cycles associated with a message transmission rate for said one of the controllers.

8. The method of claim 5, wherein isolating the fault-active controller based upon the subset of candidate fault-active controllers and the bus error counts comprises:
    determining the bus error count for each of a plurality of consecutive execution cycles, including a bus error count for an immediately previous cycle and a bus error count for a present cycle;
    monitoring a fault-active flag;
    comparing a high bus error count threshold to a sum of the bus error count for the immediately previous cycle and the bus error count for the present cycle; and
    when said sum of said bus error counts is greater than or equal to the high bus error count threshold and the fault-active flag has been set, identifying the fault-active controller based upon the subset of candidate fault-active controllers.

9. The method of claim 1, wherein executing a fault isolation process to detect and isolate presence of one of a wire open fault, a wire short fault and a controller fault when one of the controllers is identified as an inactive controller comprises identifying a physical location of the fault in one of the CAN bus, a power grid and a ground grid.

10. The method of claim 1, wherein detecting presence of a fault associated with a persistent bus disturbance in the CAN when a bus error count is greater than a predetermined threshold continuously for a predetermined period of time comprises detecting one of an impedance fault and a controller fault that has not yet caused a bus-off fault.

11. Method for monitoring a controller area network (CAN) including a plurality of CAN elements comprising a communication bus and a plurality of controllers, comprising:
    periodically executing an integrated controller area network monitoring control scheme to monitor and detect presence of communications faults in the CAN, including:
        identifying each of the controllers as one of an active controller and an inactive controller comprising:
            generating a CAN system model comprising CAN elements including the controllers, the communication bus, and a plurality of power links and ground links;
            identifying a plurality of candidate faults associated with each of the CAN elements including identifying node-silent faults for the plurality of controllers, link open faults on the communication bus, power link open faults for the plurality of power links, and ground link open faults for the plurality of ground links; and
            identifying each of the controllers as one of an active controller and an inactive controller based upon the CAN system model and monitored signal communications on the communication bus;
        executing a fault-active controller isolation process to detect and isolate presence of a fault-active controller;

executing a fault isolation process to detect and isolate presence of one of a wire open fault, a wire short fault and a controller fault; and detecting presence of a fault associated with a persistent bus disturbance in the CAN.

12. The method of claim 11, wherein identifying each of the controllers as an inactive controller based upon the CAN system model and monitored signal communications on the communication bus comprises identifying one of the controllers that is communications silent when one of the candidate faults is present based upon the CAN system model.

13. The method of claim 11, wherein executing a fault-active controller isolation process to detect and isolate presence of a fault-active controller comprises:

monitoring bus communications including determining bus error counts for a plurality of execution cycles;

when a bus error count associated with message transmission from one of the controllers exceeds a predetermined threshold, prohibiting said one of the controllers from communicating on the communications bus for a predetermined period of time and including said one of the controllers in a subset of candidate fault-active controllers;

removing from the subset of candidate fault-active controllers any of the plurality of controllers included within the subset of candidate fault-active controllers that successfully transmits a message; and isolating a fault-active controller based upon the subset of candidate fault-active controllers and the bus error counts.

14. The method of claim 13, wherein prohibiting said one of the controllers from communicating on the communication bus comprises prohibiting said one of the controllers from receiving messages and prohibiting said one of the controllers from transmitting messages for the predetermined period of time.

15. The method of claim 13, wherein prohibiting said one of the controllers from communicating on the communication bus comprises prohibiting said one of the controllers from communicating on the communication bus for a predetermined quantity of the execution cycles associated with a message transmission rate for said one of the controllers.

16. The method of claim 13, wherein isolating the fault-active controller based upon the subset of candidate fault-active controllers and the bus error counts comprises:

determining the bus error count for each of a plurality of consecutive execution cycles, including a bus error count for an immediately previous cycle and a bus error count for a present cycle;

monitoring a fault-active flag;

comparing a high bus error count threshold to a sum of the bus error count for the immediately previous cycle and the bus error count for the present cycle; and when said sum of said bus error counts is greater than or equal to the high bus error count threshold and the fault-active flag has been set, identifying the fault-active controller based upon the subset of candidate fault-active controllers.

17. The method of claim 11, wherein detecting presence of a fault associated with a persistent bus disturbance in the CAN comprises detecting presence of a fault associated with the persistent bus disturbance in the CAN when a bus error count is greater than a predetermined threshold continuously for a predetermined period of time.

* * * * *